United States Patent [19]

Richardson

[11] 4,083,666

[45] Apr. 11, 1978

[54] COOKIE PRESS

[76] Inventor: Walker L. Richardson, 3215 Acre La., Boise, Id. 83704

[21] Appl. No.: 727,858

[22] Filed: Sep. 29, 1976

[51] Int. Cl.² ........................................... A21C 11/18
[52] U.S. Cl. .................. 425/183; 425/192 R; 425/376 R
[58] Field of Search .............. 425/183, 185, 186, 190, 425/192, 376 R

[56] References Cited

U.S. PATENT DOCUMENTS

| 679,983 | 8/1901 | O'Neil | 425/376 R |
| 2,591,516 | 4/1952 | Darnell | 425/286 X |
| 3,001,485 | 9/1961 | Czik | 425/183 |
| 3,262,404 | 7/1966 | Morz et al. | 425/183 |

FOREIGN PATENT DOCUMENTS

| 502,626 | 10/1928 | Germany | 425/192 |
| 184,284 | 5/1936 | Switzerland | 425/192 |
| 19,938 of | 1911 | United Kingdom | 425/192 |

Primary Examiner—Francis S. Husar
Assistant Examiner—William R. Briggs
Attorney, Agent, or Firm—Frank J. Dykas

[57] ABSTRACT

The cookie press of this invention comprises a housing and a cylinder body having an electro-mechanically driven ram threadably engageable with the housing and a closure at one of the terminal ends of the body having an opening therein and a die portion contiguous with the closure and being operable to planarly rotate on the closure to terminate the flow of material through the die.

4 Claims, 6 Drawing Figures

COOKIE PRESS

FIELD OF INVENTION

This invention relates to cookie presses for forming dough or batter into ornamental shapes and more particularly to a hand held, power operated cookie press and to an automatic cookie press for dispensing a preselected quantity of dough or batter and cutting it from the press automatically.

BRIEF DESCRIPTION OF THE PRIOR ART

Cookie presses, cake decorating apparatus and the like known in the prior art generally comprise a fabric bag or cylindrical housing having a closure threadably engaged therewith at one end of the housing, the closure having a die form through which dough, batter or other semi-plastic food material is extruded to form an ornamental shape to the dough, batter or other semi-plastic food material, and means for forcing the dough, batter or other semi-plastic food material from the fabric bag or cylindrical housing. Dough, batter or other semi-plastic food materials are placed in the bag or housing. Where fabric bags are used, the material is forced and thereby extruded through the die by squeezing the material from the bag. Where cylinder housings are used the material is usually forced from the housing by a ram manually operated being moved toward the die in the closure portion or by air or gas under pressure. In any event it is difficult to dispense or extrude a uniform quantity of material from such dispensers and to terminate the flow of material from the apparatus. Additionally, manually operated cookie presses require two handed operation, one to hold the press in position and the second to operate the manual ram or to compress the fabric bag.

Accordingly, it is an important object of this invention to provide a means of power operating a cookie press which is contained in a drive housing attached to the cookie press and compact enough to be hand held, thereby facilitating one-handed operation.

Another important object of this invention to provide in a cookie press means for dispensing volumetric quantities of material.

Another object of this invention is to provide means integral with a cookie press to terminate the flow of material and to cut off the material extruded through the die closure.

These and other objects shall become clear from the specification following when taken with the attached drawings.

SUMMARY OF INVENTION

The cookie press of this invention comprises a housing and a body having an electro-mechanically driven ram threadably engageable with the housing and a closure at one of the terminal ends of the body portion contiguous with the closure and being operable to planarly rotate on the closure to terminate the flow of material through the die. In a further embodiment herein set out the ram is driven by a rack and pinion in response to the rotation of an electric motor. The die portion is slidably moved over the opening in the closure in response to movement of a slip ring engageable with the die and the housing. In a further embodiment of the invention the ram is provided with teeth which are selectively engaged by a pawl which is moved upwardly and downwardly in response to a reversably driven solenoid. A second pawl may also be used and employed to slidably move over a star gear which is lifted or caused to rotate in response to the upward movement of the pawl by the solenoid to cause movement of the die after each downward movement of the ram to terminate the flow of material and to shear or cut-off material forced through the die in response to the downward movement of the ram.

A more thorough and comprehensive understanding of the invention may be had from the description of the preferred embodiment reference being had to the accompanying drawings.

DESCRIPTION OF PREFERRED EMBODIMENT

Figure 1:
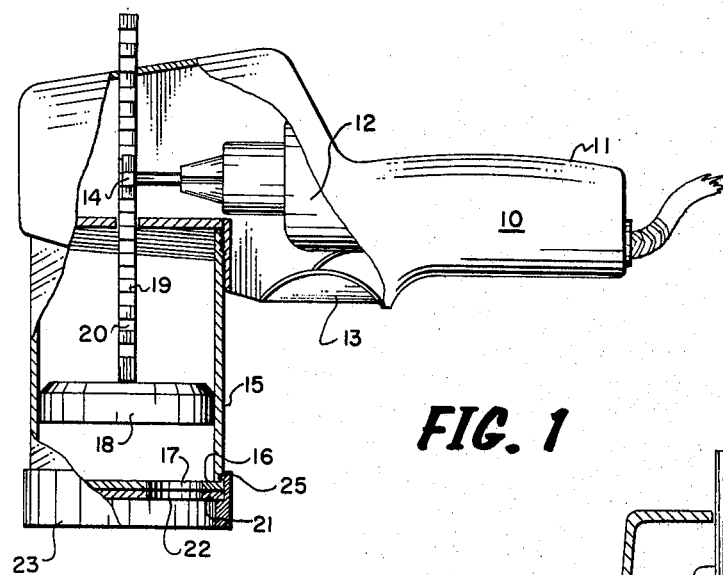
FIG. 1 is a side elevational view of the cookie press of this invention with selected portions cut away and showing cross sectional portion to show to advantage the details of construction of the invention.
Figure 2:
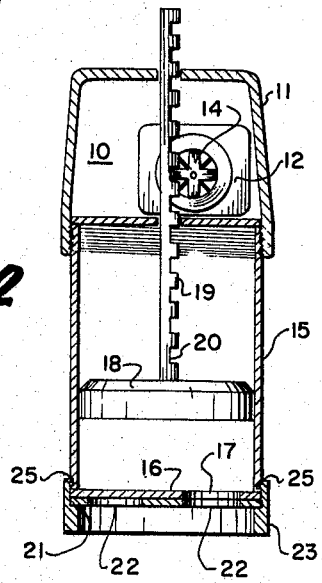
FIG. 2 is a cross sectional front elevational view of the invention.

Referring now to the drawings and more particularly to the FIGS. 1 and 2, the cookie press of this invention is generally shown and designated by the numeral 10. The press 10 includes a drive housing 11 enclosing a reversably driven motor 12, a switch 13 and a gear 14. The drive housing is threadably engageable with a cylindrical body portion 15 having a closure portion or wall 16. The closure portion 16 is provided with an opening 17. A ram 18 having a shaft 19 including a plurality of notches 20 spaced apart at intervals is provided so that the ram 18 is moved inside the body portion 15 in response to rotation of the gear 14 which is in engagement with notches 20 on the shaft 19. In practise it has been found to advantage to provide notches 20 to the terminal end of the shaft 19 so that the ram 18 and the shaft 19 may be selectively engaged and disengaged from the gear 14 for cleaning.

Figure 3:
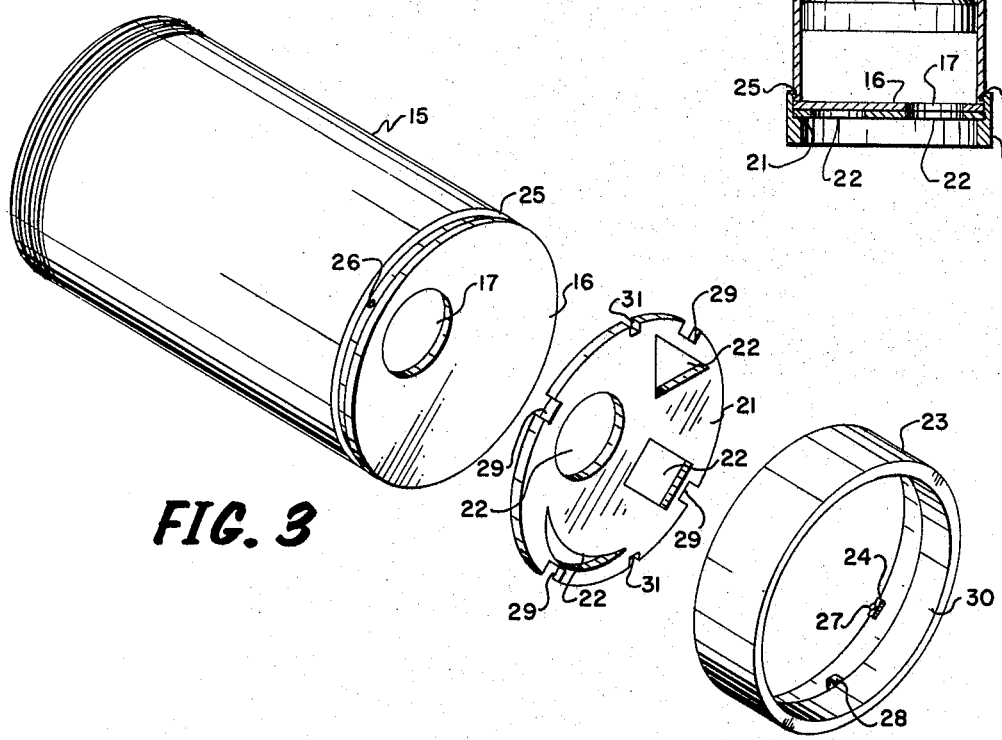
FIG. 3 is an exploded perspective view of the cylindrical housing, a die and the slip ring portion of the invention showing to advantage the closure portion and the manner of engagement of the die and slip ring portions.

Referring now to FIG. 3 a die plate 21 having a multiplicity of ornamentally configured openings 22 is provided. The openings 22 may be any of a variety of selected shapes and may be identical to each other on the same plate. A slip ring 23 engageable with the body 15 is also provided. The slip ring 23 includes a plurality of inwardly projecting lugs 24 at one of its terminal edges. The lugs 24 engage a recessed annular ring 25 provided in the body 15 distally from the terminal end adjacent the closure portion 16. The annular ring 25 on the body 15 is provided with detents 26 preferrably located at selected intervals coincident with the die openings in the ring 25. An outwardly projecting knob 27 is provided on each of the lugs 24 and are engageable with the detents 26 on the body 15. Hence, the slip ring 23 may be selectively moved about the body 15 to selected points. The slip ring 23 is provided with die lugs 28 engageable with die notches 29 provided in the die plate 21. In this manner the die plate 21 is juxtapositioned in the slip ring 23 and is caused to be moved in response to movement of the slip ring 23. A die retaining lip 30 is provided on the slip ring 23. Slots 31 are provided on the die plate so that the die plate 23 may be inserted into the slip ring 23 over the lugs 24.

In operation dough, batter or other semi-plastic food material is placed in the body 15. The notches 20 of the shaft 19 of the ram 18 are engageable with the gear 14 on the motor 12. The gear and the motor may be rotatably driven by pushing the shaft 19 upwardly until the ram 18 is adjacent the housing 11. The body 15 may then be threadably engaged with the housing 11. A die plate 21 is then juxtapositioned in the slip ring 23 which may then frictionally be snapped into place in the annular ring 25 on the body 15 adjacent the closure 16. The slip ring 23 is then rotated until a knob 27 on the lug 24 of the slip ring 23 engages the detent 26 in the annular ring 25 on the body 15. In this manner an ornamental opening 22 of the die plate 21 is aligned with the opening 17 of the body 15. The shaft 19 and ram 18 is driven downwardly in response to rotation of the motor 12 and the gear 14 when the switch 13 energizes the motor 12 when depressed. The ram 18 forces the semi-plastic food material through the opening 17 in the body 15 and extrudes a preselected quantity of the material through an ornamental opening 22 of the die plate 21. The slip ring 23 carrying the die plate 21 may then be rotated to terminate the flow of material and to shear the material from the press 10 as the trailing edge of the die opening 22 passes the opening 17 of the body 15.

Figure 4:
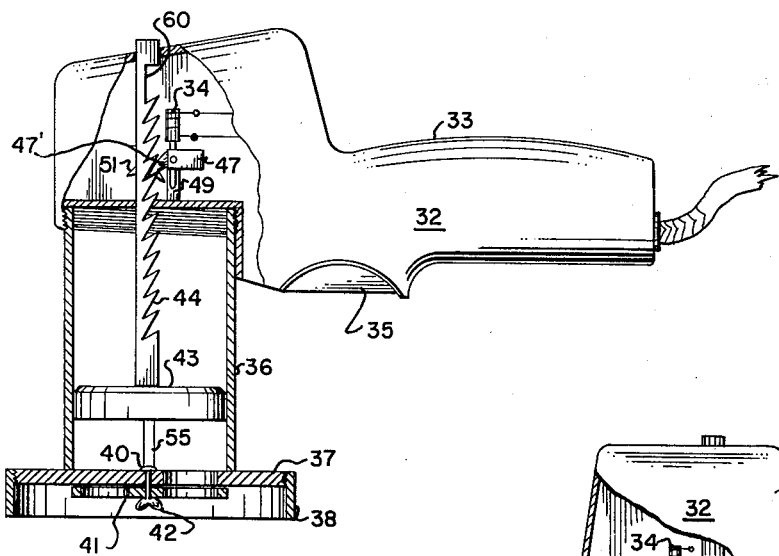
FIG. 4 is a side elevational view with portions cut away to show the details of construction of a further embodiment of the present invention.
Figure 5:
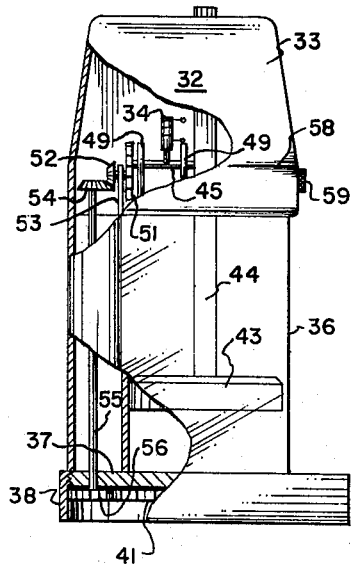
FIG. 5 is a front elevational view of the apparatus of FIG. 4 with selected portion cut away to clearly show other details of construction.

Referring now to the FIGS. 4 and 5 a further embodiment of the cookie press of this invention is shown and generally identified by the numeral 32. Although many elements are comparable or even identical with the above described embodiment other indicia are used to more clearly distinguish the elements of the two embodiments. The cookie press 32 includes a housing 33, a solenoid 34 electrically interconnected to a switch 35 mounted in the housing 33. A cylindrical body 36 is threadably engageable in the housing 33. The body 36 includes bottom wall 37 having a downwardly depending annular ring 38. An outlet 39 is provided in the bottom wall 37 through which semi-plastic food materials may be extruded. A bolt 40 is centrally located in the bottom wall 37 operable to receive an extruding die 41 such as shown to advantage in the FIG. 6. The die 41 is suitably fastened to the bolt 40 by a wing nut 42. A ram 43 having a rack-like shaft 44 is carried in the housing 33.

Figure 6:
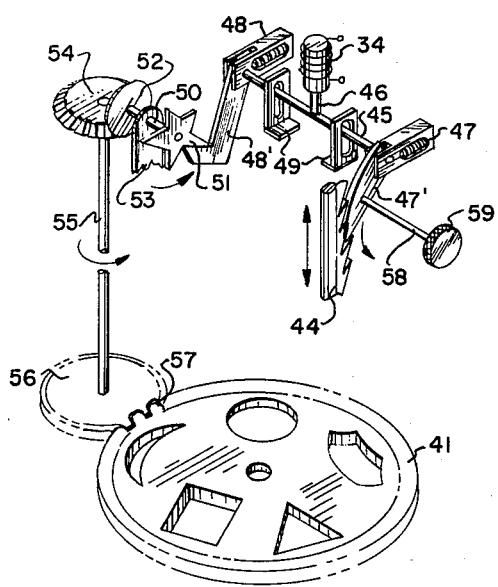
FIG. 6 is a fragmentary perspective view of the driving means of the ram and die portions.

Referring now more particularly to the FIG. 6 which shows to advantage the solenoid drive assembly, a solenoid cross-shaft 45 is provided on the shaft 46 of the solenoid 34. At the opposite terminals ends of the cross-shaft 45 are mounted a pair of spring loading, pawl carrying housings 47 and 48 having respective pawls 47' and 48'. A pair of slotted guide pedestals 49 are disposed between the pawl carrying housings 47 and 48. A second cross shaft 50 having a star gear 51 at one of its terminal ends and a sun gear 52 at its opposite terminal end is journalled for rotation in a mounting pedestal 53 carried by the housing 33. The sun gear 52 is in communication with a sun gear 54 carried by an upstanding die plate shaft 55 journalled for rotation in the housing 33. At the end opposite the sun gear 54 on the upstanding die plate shaft 55 is a spur gear 56. The spur gear 56 engages gear teeth 57 provided about the periphery of the die plate 41 to juxtaposition die openings of the die 41 with the outlet 39. As the shaft 46 of the solenoid 34 is moved downwardly in response to electrical energy applied to the solenoid when the switch 35 is engaged, the pawl 47' urges the shaft 44, and, consequently the ram 43 downwardly. The pawl 48' is urged rearwardly by the sloping face of the star gear 51 as the shaft 46 is moved downwardly. As the shaft 46 retracts the pawl 47' is urged rearwardly by the sloping face of the rack-like shaft 44 and the pawl 48' lifts the star gear 51 upwardly causing the shaft 50 to rotate the gears 52, 54 and 56 and consequently the die 41 causing the die 41 to shear semi-plastic food material from the press 32. Suitable electrical or mechanical means commonly known in the art to selectively adjust the throw of the ram 46 of the solenoid 34 may be used so that a volumetric quantity of material extruded from the press 32 may be selectively controlled.

A shaft 58 having one of its ends suitably fastened to the pawl 47' and including a knob 59 is journalled for rotation in the housing 33. When the rack-like shaft 44 is fully in its downward extended position, the pawl 47' may be rotated in a groove 60 provided distally near the top of shaft 44 in response to rotation of the knob 59 and the shaft 58, and thereby permitting the removal of the ram 43 and the shaft 44 or to juxtaposition the same in its uppermost position in the housing.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. An improved cookie press comprising a drive housing, power drive means mounted in said housing, switch means selectively operable to control said power drive means, upstanding cylindrical body threadably engageable with said drive housing, said cylindrical body including a bottom wall having an outlet opposite the threadably engaging end of said body portion, a ram having an upstanding shaft, said ram being disposed in said body, said upstanding shaft having first drive mmeans operatively connected to said power drive means for urging said ram downwardly in said body, a die plate rotatably attached to the bottom of the upstanding cylindrical body having a plurality of ornamental die openings selectively positionable over said outlet, said die plate including second drive means, and third drive means operatively connected to said power drive means and to said second drive means so that actuation of said power drive means rotates said die plate.

2. The article of claim 1 wherein said power drive means comprises a solenoid including a downwardly throwing shaft mounted in said drive housing.

3. The article of claim 2 wherein said upstanding shaft includes a plurality of rack-like notches and said first drive means comprises a pawl, spring loading means operable to forwardly urge said pawl into engagement with said rack-like notches during the downward throw of said solenoid, means selectively urging said pawl away from said upstanding shaft to permit removal of said ram from said upstanding cylindrical body.

4. An improved cookie press comprising a drive housing, and upstanding cylindrical body threadably engageable with said drive housing, said cylindrical body including a bottom wall having an outlet opposite the threadably engaging end of said body portion, a ram having an upstanding shaft, said ram being disposed in said body, said upstanding shaft having a plurality of rack-like notches, a solenoid including a downwardly throwing shaft mounted in the drive housing, a cross shaft, spring loading means operable to forwardly urge said pawl into engagement with said rack-like notches during the downward throw of said solenoid, means selectively urging said pawl away from said shaft of said ram to permit removal of said ram and upstanding shaft from said upstanding cylindrical body, a die plate having a plurality of ornamental die openings and gear teeth around its periphery rotatably attached to the bottom of the upstanding cylindrical body, an upstanding die plate shaft having a sun gear at its upstanding end and a spur gear at its bottom end operatively connected to the gear teeth on the periphery of the die plate, a second cross shaft rotatably mounted in the drive housing having a star gear at one end and a second sun gear at the opposite end operatively connected to the die plate shaft sun gear, a second pawl carried by the opposite end of the solenoid cross shaft, spring loading means operable to forwardly urge said second pawl into engagement with the star gear during the return throw of the downwardly throwing solenoid.

* * * * *